(12) United States Patent
Krasny et al.

(10) Patent No.: US 8,379,773 B2
(45) Date of Patent: Feb. 19, 2013

(54) METHOD AND APPARATUS FOR ENHANCED CHANNEL ESTIMATION IN WIRELESS COMMUNICATION SYSTEMS

(75) Inventors: Leonid Krasny, Cary, NC (US); Jiann-Ching Guey, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 829 days.

(21) Appl. No.: 12/489,924

(22) Filed: Jun. 23, 2009

(65) Prior Publication Data

US 2010/0322357 A1 Dec. 23, 2010

(51) Int. Cl.
*H04L 27/06* (2006.01)

(52) U.S. Cl. ........ 375/341; 375/346; 375/262; 375/260; 375/265; 375/349

(58) Field of Classification Search ........... 375/349, 375/341, 262, 346, 260, 265
See application file for complete search history.

(56) References Cited

U.S. PATENT DOCUMENTS

| 7,801,232 | B2* | 9/2010 | Sung ............................. 375/260 |
| 2005/0135509 | A1 | 6/2005 | Mantravadi et al. |
| 2007/0159959 | A1* | 7/2007 | Song et al. .................... 370/208 |
| 2007/0206689 | A1* | 9/2007 | Koo et al. ..................... 375/260 |
| 2010/0054322 | A1* | 3/2010 | Hui et al. ...................... 375/232 |
| 2010/0203841 | A1* | 8/2010 | Hwang et al. .............. 455/67.14 |

FOREIGN PATENT DOCUMENTS

WO WO 2008/039026 A1 4/2008

OTHER PUBLICATIONS

Guey et al. "low complexity channel estimation for minimizing edge effect in OFDM systems";2007;pp. 1440-1444.*

* cited by examiner

*Primary Examiner* — Daniel Washburn
*Assistant Examiner* — Rahel Guarino (57) ABSTRACT

A method and apparatus for channel estimation based on extracting channel information, including noise spectral density, from a received signal, and advantageously exploiting that information for improved channel estimation accuracy. One embodiment is directed to a method of generating channel estimates in a wireless communication receiver, for processing a received communication signal. The method includes generating first channel estimates from a set of pilot observations obtained from the received communication signal, using a first channel estimation process that is not dependent on knowledge of channel statistics. The method further includes estimating channel statistics and a noise variance from the first channel estimates, and generating second channel estimates from the set of pilot observations, the estimated channel statistics, and the estimated noise variance, using a second channel estimation process that is dependent on knowledge of the channel statistics.

20 Claims, 4 Drawing Sheets

| # OF TX ANTENNAS PER UE | 1 |
|---|---|
| # OF RX ANTENNAS PER BS | 1 |
| DISTANCE DEPENDENT PATH LOSS | L=35.3 + 37.6 log(d) [dB] |
| SHADOW FADING | Log-normal, 8 dB STANDARD DEVIATION |
| MULTIPATH FADING | 3GPP TYPICAL URBAN (SCM) |
| DISTANCE DEPENDENT PATH LOSS | L=35.3 + 37.6 log(d) [dB] |
| CELL LAYOUT | HEXAGONAL GRID, 2 CELLS |
| INTER-SITE DISTANCE | 500 m |
| SPECTRUM ALLOCATION | 4.5 MHz |
| UE TRANSMITTED POWER | 0.4 W |
| MODULATION AND CODING SCHEMES | QPSK, 16QAM, AND 64QAM |
| TURBO DECODER | Log_MAP |
| CODING RATE | 0.4 |
| CHANNEL QUALITY ESTIMATION | ERROR-FREE, NO DELAY |
| LINK ADAPTATION | IDEAL |
| RECEIVER | IRC |

*FIG. 6*

METHOD AND APPARATUS FOR ENHANCED CHANNEL ESTIMATION IN WIRELESS COMMUNICATION SYSTEMS

FIELD OF THE INVENTION

The present invention generally relates to wireless communications, and particularly relates to generating channel estimates in a wireless communication receiver.

BACKGROUND

Wireless communication receivers estimate propagation channel characteristics and use the estimates to compensate received signals for channel-induced distortion. More advanced receiver types base interference suppression processing on accurate channel estimation. However, generating accurate channel estimates is challenging, particularly with the growing complexity of communication signal structures.

Multiple-Input-Multiple-Output (MIMO) systems, for example, pose particular challenges, where channel estimation generally must account for the interplay between $N_{tx}$ transmit antennas and $N_{rx}$ receive antennas. With pilot-assisted channel estimation, the transmitter transmits a number of known (or pre-determined) symbols from each transmit antenna, thereby allowing estimation of the MIMO channel by the receiver. The LTE standards, as developed by the Third Generation Partnership Project (3GPP), use pilot-assisted channel estimation.

LTE uses an Orthogonal Frequency Division Multiplex (OFDM) carrier signal comprising a plurality of narrowband sub-carriers spanning an overall OFDM bandwidth. Resource allocations assign particular frequencies (sub-carriers) at particular times. In this respect, an OFDM signal "chunk" may be defined as a block of $N_t$ consecutive OFDM symbols (along the time axis) and $N_f$ consecutive sub-carriers (along the frequency axis).

A simplifying assumption is that the channel does not change in time over one chunk and therefore all the pilot symbols are placed in the first OFDM symbols of the chunk. Let $\{P_j(f_m)\}_{m=1}^{M}$ denote the subset of elements of a chunk transmitted from transmit antenna j that are devoted to pilots. That is, M pilot symbols will be transmitted during each chunk from transmit antenna j. The subset of indexes $\{f_m\}_{m=1}^{M}$ for each transmit antenna is determined by the chosen pilot pattern in the frequency-time domain. Similarly, let $\{Y_{i,j}(f_m)\}_{m=1}^{M}$ denote the received signal at the i-th receive antenna corresponding to the pilots $\{P_j(f_m)\}_{m=1}^{M}$.

Assuming that the pilot symbols transmitted by different antennas are orthogonal, i.e. if $P_j(f_m)$ is a pilot symbol on the j-th antenna, then $P_{j1}(f_m)=0$ for all $j_1 \neq j$. This implies that the relationship between $Y_{i,j}(f_m)$ and $\{P_j(f_m)\}_{m=1}^{M}$ can be described by the following expression:

$$Y_{i,j}(f_m) = H_{i,j}(f_m) \times P_j(f_m) + V_i(f_m), 1 \leq m \leq M, \quad (Eq. 1)$$

where $H_{i,j}(f)$ is the frequency response of the channel between the j-th transmit antenna and the i-th receive antenna corresponding to the f-th sub-carrier, and $V_i(f)$ is a spatially uncorrelated white noise at the i-th receive antenna (antenna thermal noise+other-cell interference) with spectral density $g_i$.

The goal of the channel estimation is to find the estimate of the MIMO channels $H_{i,j}(f)$ based on observations of $\{Y_{i,j}(f_m)\}_{m=1}^{M}$ and a priori knowledge of the transmitted pilot symbols $\{P_j(f_m)\}_{m=1}^{M}$. One approach is to use Maximum A Posteriori (MAP) channel estimation. Assuming that MIMO channels have Gaussian distribution, it has been shown that MAP channel estimation algorithm can be expressed as $$\hat{H}_{i,j}(f) = \sum_{m=1}^{M} W_j(f, f_m) Y_{i,j}(f_m), \quad (Eq. 2)$$

where $\hat{H}_{i,j}(f)$ denotes the estimate of the channel $H_{i,j}(f)$.

In Eq. (2), the coefficients $W_j(f,f_m)$ are computed as follows:

$$W_j(f, f_m) = \sum_{m=1}^{M} K_H(f, f_p) P_j(f_p) A_j^{-1}(f_p, f_m), \quad (Eq. 3)$$

where $A_j^{-1}(f_p, f_m)$ are the elements of the matrix $A_j^{-1}$ which is inverse to the matrix $A_j$ with elements $$A_j(f_p, f_m) = g_i \delta(f_p - f_m) + P_j^*(f_p) K_H(f_p, f_m) P_j(f_m), \quad (Eq. 4)$$

and $$K_H(f_p, f_m) = E\{H_{i,j}(f_p) H_{i,j}^*(f_m)\} \quad (Eq. 5)$$

is the correlation matrix of the channel $H_{i,j}(f)$ in frequency domain. From these expressions, one sees that the MAP-based approach relies on knowledge of second-order channel statistics, including the channel correlation matrix $K_H(f_p, f_m)$, and the noise spectral density $g_i$.

Another well known approach to channel estimation relies on the Maximum Likelihood (ML) algorithm. Denoting the impulse response of the channel between the j-th transmit antenna and the i-th receive antenna by $$h_{i,j}^{(ML)}(l) = \sum_{f=1}^{N_f} H_{i,j}(f) \exp\left\{j2\pi \frac{lf}{N_f}\right\}, 1 \leq l \leq L, \quad (Eq. 6)$$

the ML channel estimation algorithm can be expressed as $$\hat{h}_{i,j}(l) = \sum_{s=1}^{L} F_j^{-1}(l, s) \sum_{n=1}^{N} p_j^*(s-n) y_{i,j}(n), \quad (Eq. 7)$$

where L is the number of channel taps, N is the number of received samples in time domain, $y_{i,j}(n)$ and $P_j(n)$ are respectively Fourier transforms of the received signal $Y_{i,j}(f)$ and pilots $P_j(f)$ at time $n*\Delta t$ ($\Delta t$ is a sampling interval), and $F_j^{-1}(l,s)$ are the elements of the matrix $F_j^{-1}$ which is inverse to the matrix $F_j$ with elements $$F_j(l, s) = \sum_{n=1}^{N} p_j^*(l-n) p_j(s-n). \quad (Eq. 8)$$

While the ML estimator is simpler to implement in some respects than MAP-based estimators—e.g., ML estimation does not require a priori knowledge of channel statistics, as does MAP estimation—ML estimation can yield poor results in some circumstances. For example, ML estimation does not perform particularly well for MIMO systems with spatially distributed antennas.

SUMMARY

This document discloses a method and apparatus for channel estimation based on extracting channel information, including noise spectral density, from a received signal, and advantageously exploiting that information for improved channel estimation accuracy. One embodiment is directed to a method of generating channel estimates in a wireless communication receiver, for processing a received communication signal. The disclosed method includes generating first channel estimates from a set of pilot observations obtained from the received communication signal, using a first channel estimation process not dependent on knowledge of channel statistics. The method further includes estimating channel statistics and a noise variance from the first channel estimates, and generating second channel estimates from the set of pilot observations, the estimated channel statistics, and the estimated noise variance, using a second channel estimation process dependent on knowledge of the channel statistics.

As a further advantage, one or more embodiments of the above described method include generating revised estimates of the channel statistics and noise variance from the second channel estimates, and generating revised second channel estimates from the set of pilot observations, the revised estimated channel statistics, and the revised estimated noise variance. Iterations beyond this second round of refinements also may be used, where the improved statistical estimations from a preceding iteration are used to improve channel estimation in a succeeding iteration.

Another embodiment provides a receiver circuit for generating channel estimates, for processing a received communication signal in a wireless communication receiver. The receiver circuit includes first and second channel estimators, and a statistical estimator. The first channel estimator is configured to generate first channel estimates from a set of pilot observations obtained from a received communication signal, using a first channel estimation process not dependent on knowledge of channel statistics, and the statistical estimator is configured to estimate channel statistics and a noise variance from the first channel estimates. Further, the second channel estimator is configured to generate second channel estimates from the set of pilot observations, the estimated channel statistics, and the estimated noise variance. Here, the second channel estimator uses a second channel estimation process that is dependent on knowledge of the channel statistics.

This example receiver embodiment, and the earlier method example, thus may be understood as running two channel estimation processes, where the first process does not require knowledge of the channel statistics, and the second one does. More particularly, in at least one embodiment, the second channel estimation process is known or expected to provide superior channel estimation accuracy as compared to the first channel estimation process, under at least some conditions. The first channel estimation process, however, is sufficiently good to bootstrap or otherwise seed the second process with requisite statistical information.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
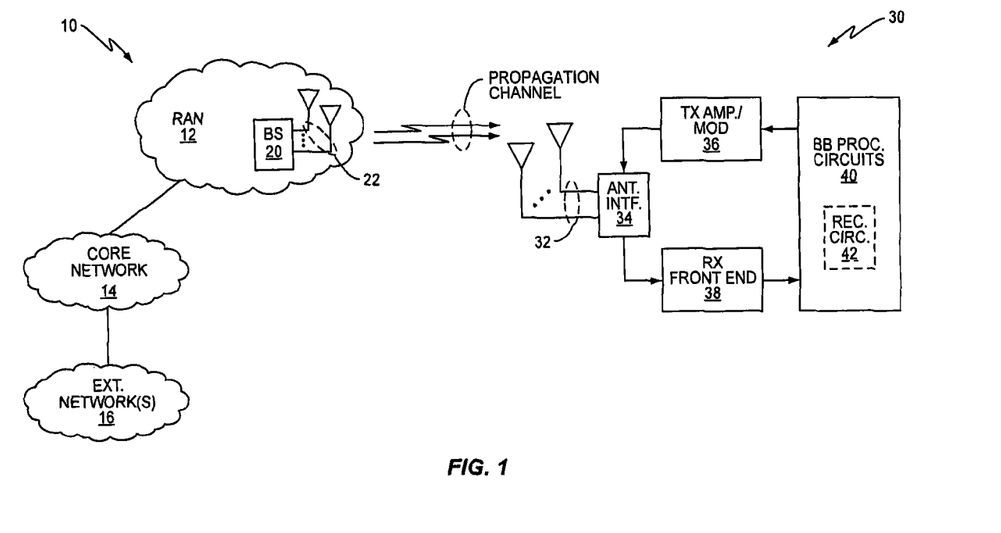
FIG. 1 is a block diagram of one embodiment of a wireless communication network and an associated mobile terminal that includes a receiver circuit for channel estimation as proposed herein.

FIG. 1 is a simplified illustration of one embodiment of a wireless communication network 10, which includes a Radio Access Network (RAN) 12 and a Core Network (CN) 14, which may be coupled to one or more external networks 16. For example, the CN 14 may couple directly or indirectly to the Internet and/or to other data networks.

The RAN 12 includes a number of base stations 20—one is shown for simplicity—each having one or more transmit antennas 22, for transmitting radiofrequency signals to and receiving radiofrequency signals from mobile terminals 30—one is shown for simplicity. The signals are propagated over the air, and thus pass through one or more propagation channels. The propagation channel(s) typically are multipath, and, for MIMO implementations involving multi-antenna transmission and reception, there may be a number of propagation channels involved, corresponding to the different transmit/receive antenna pairings.

Accordingly, the illustrated embodiment of the mobile terminal 30 includes one or more transmit/receive antennas 32, which are coupled through antenna interface circuitry 34 to a transmit circuit 36, and a receiver front-end circuit 38. Baseband processing circuits 40 provide signal processing and control functions for the transmitter and receiver front-end circuits 36 and 38, and may be implemented, for example, using one or more microprocessors, digital signal processors, Application Specific Integrated Circuits (ASICs), Field Programmable Gate Arrays, or other digital processing circuitry.

Of particular interest, the processing circuits 40 include a receiver circuit 42 for generating channel estimates, for processing a received communication signal in a wireless communication receiver, e.g., the mobile terminal 30. Such circuitry may be pre-programmed or may operate according to stored program instructions, which are maintained in a computer-readable medium within the mobile terminal 30—e.g., non-volatile FLASH memory or EEPROM.

Figure 2:
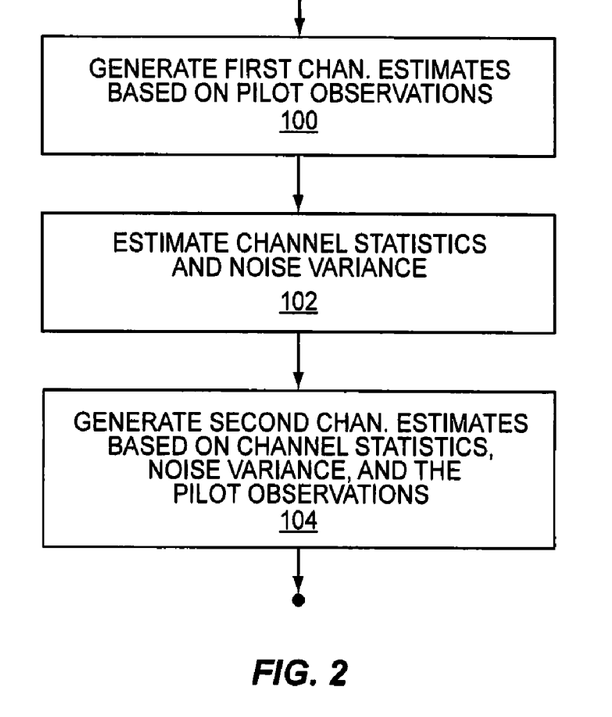
FIG. 2 is a logic flow diagram for one embodiment of a method of channel estimation.

In one or more embodiments, the receiver circuit 42 is configured to implement a method of generating channel estimates, for processing a received communication signal. The method includes generating first channel estimates from a set of pilot observations obtained from the received communication signal, using a first channel estimation process not dependent on knowledge of channel statistics, and estimating channel statistics and a noise variance from the first channel estimates. The method further includes generating second channel estimates from the set of pilot observations, the estimated channel statistics, and the estimated noise variance, using a second channel estimation process dependent on knowledge of the channel statistics.

The receiver circuit 42 comprises, for example, signal processing circuitry that is configured to carry out channel estimation processing as proposed herein, within the mobile terminal 30. However, it should be understood that the base station 20 also includes (RF) transceiver circuits and associated signal processing and control circuits. As such, those skilled in the art should appreciate that a version of the receiver circuit 42, as adapted for base station use, is contemplated herein.

Figure 3:
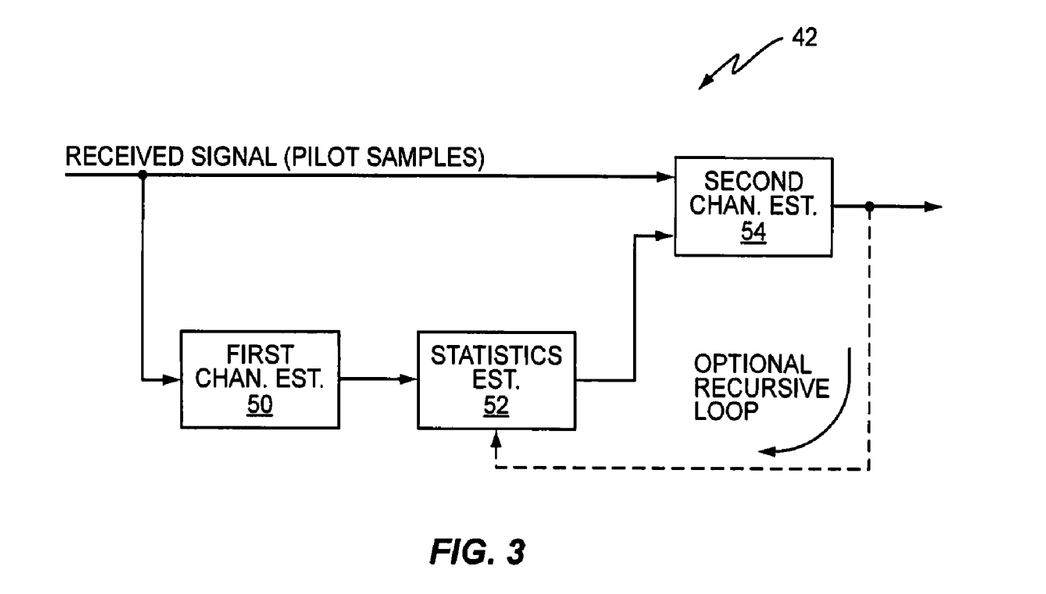
FIG. 3 is a block diagram of one embodiment of a receiver circuit configured for channel estimation.

As for the illustration, FIG. 3 depicts an embodiment of the receiver circuit 42 in more detail. The illustrated circuitry comprises a first channel estimator 50, a statistics estimator 52, and a second channel estimator 54. The first channel estimator 50 is configured to generate first channel estimates from a set of pilot observations obtained from a received communication signal, using a first channel estimation process not dependent on knowledge of channel statistics. The statistical estimator 52 is configured to estimate channel statistics and a noise variance—which may be expressed as a noise spectral density—from the first channel estimates. Correspondingly, the second channel estimator 54 is configured to generate second channel estimates from the set of pilot observations, the estimated channel statistics, and the estimated noise variance, using a second channel estimation process dependent on knowledge of the channel statistics.

For example, in one or more embodiments, the first channel estimator 50 is configured to generate the first channel estimates in a Maximum Likelihood (ML) estimation process, or in a Least Squares Estimation (LSE) process, based on the set of pilot observations and corresponding known nominal pilot symbol values. The ML and LSE estimation processes do not require a priori knowledge of the channel statistics and noise variance, and thus provide an advantageous basis for initially processing the pilot observations to obtain initial (first) channel estimates.

Unlike the first channel estimation process, the second channel estimation process is a Bayesian estimation process that is dependent on a priori statistical knowledge of the channel. For example, the second channel estimator 54 is configured to generate the second channel estimates in a Maximum a Posteriori (MAP) estimation process, based on the estimated channel statistics and the estimated noise variance obtained from the first channel estimation process, and the set of pilot observations. Thus, the same set of pilot observations for the same received signal—e.g., one or more OFDM chunks—is used for two channel estimation processes. In particular, the first channel estimation process uses the pilot observations to estimate channel statistics and noise variance, where, for example, the statistical estimator 52 is configured to estimate a frequency-domain channel correlation matrix as the channel statistics.

The estimation of channel statistics as a frequency-domain channel correlation matrix is particularly useful in the OFDM context. For example, the mobile terminal 30 in one or more embodiments comprises an OFDM receiver (transceiver), and the received communication signal comprises an OFDM signal including a number of pilot symbols at given sub-carrier frequencies within an OFDM frequency band. The pilot observations taken by the terminal 30 correspond to the pilot symbols.

In this context, the first channel estimator 50 is configured to generate the first channel estimates by determining channel taps—processing delays—at which to generate respective ones of the first channel estimates. The estimator's determination is based on transforming received pilot symbols into the time domain to obtain a set of channel taps, and selecting channel taps in the set that are above a defined strength threshold. That is, a measure of received signal strength, or another indication of signal power at the individual channel taps can be used to select a subset of the channel taps for processing use.

In any case, the first channel estimator 50 in such embodiments is configured to generate the first channel estimates by translating the pilot observations into the time domain and generating time-domain channel estimates therefrom, and then translating the time-domain channel estimates back into the frequency domain, to obtain the first channel estimates. Correspondingly, the statistical estimator 52 is configured to estimate the channel statistics in the frequency domain, based on the (frequency domain) first channel estimates.

Continuing from these first channel estimates, the second channel estimator 54 is configured to generate the second channel estimates by computing a linear interpolation filter in the frequency domain. The linear interpolation filter is used to generate the second channel estimates for one or more data sub-carrier frequencies within the OFDM frequency band, which are different than the given sub-carrier frequencies of the pilot symbols. That is, by using the linear interpolation filter, the second channel estimator 54 can generate channel estimates at essentially any arbitrary frequency within a given OFDM frequency band, meaning that it can estimate channel response at sub-carrier frequencies, although those frequencies are different from the pilot sub-carrier frequencies.

Figure 4:
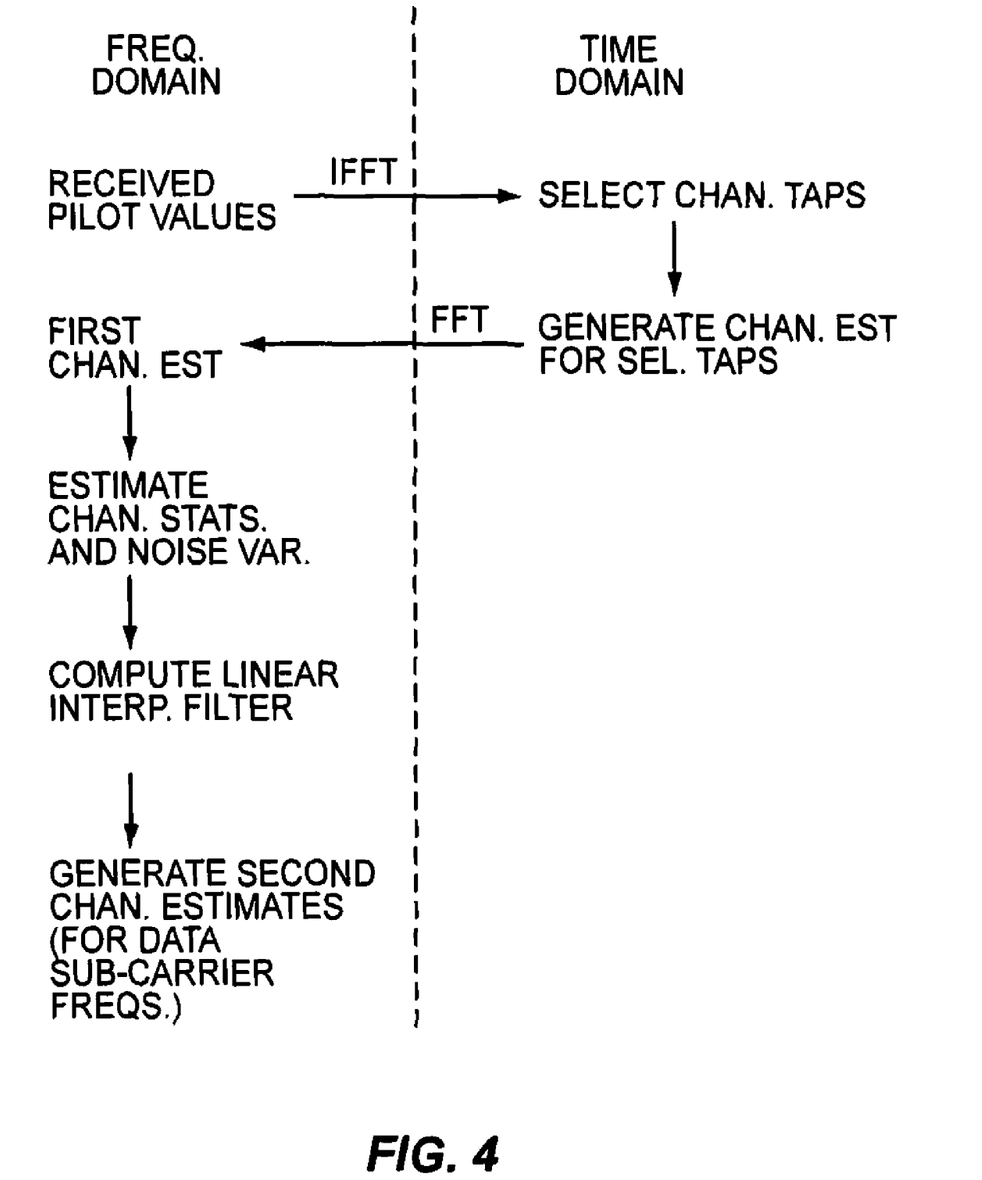
FIG. 4 is a flow diagram illustrating one embodiment of time domain and frequency domain processing operations, for channel estimation as proposed herein for an OFDM received signal.

FIG. 4 illustrates one embodiment of such processing, where the dashed vertical line indicates the division between the frequency domain and the time domain, in terms of the receiver circuit's processing. One sees that for the OFDM example, received pilot values—i.e., pilot symbols at given sub-carrier positions within an OFDM chunk—are converted into the time domain via, e.g., an Inverse Fast Fourier Transform (IFFT). The receiver circuit 42 selects channel taps within the time domain, and generates time-domain channel estimates for the selected channel taps. These time-domain channel estimates are then transformed back into the frequency domain, e.g., via an FFT.

Once converted back into the frequency domain, these channel estimates are considered the "first channel estimates," and they are used to estimate the second-order channel statistics and noise variance in the frequency domain. Frequency-domain processing further includes computation of the linear interpolation filter, and use of that filter to generate the second channel estimates (for the OFDM data sub-carriers).

Referring back to FIG. 3 for the moment, one also sees the indication of an optional recursive loop through the statistics estimator 52 and the second channel estimator 54. In such embodiments, the statistical estimator 52 is configured to generate revised estimates of the channel statistics and the noise variance from the second channel estimates. That is, the second channel estimates as output from the second channel estimator 54 are used to refine the receiver circuit's estimation of the channel statistics and noise variance.

In turn, the second channel estimator 54 is configured to generate revised second channel estimates from the set of pilot observations, the revised estimated channel statistics, and the revised estimated noise variance. Thus, the second channel estimates are used to revise the channel statistics and noise variance estimates, and then those revised estimates are used to generate a revised set of second channel estimates.

Various embodiments of the receiver circuit 42 may be configured to perform additional iterations, where the revised second channel estimates from a prior iteration are used to generate improved revised estimates of the channel statistics and noise variance in a next iteration, which in turn are used to generate a revised set of second channel estimates. Such iteration is fixed to a defined number of runs in one embodiment, while another embodiment controls the number of iterations based on one or more criterion, such as the change in revised estimates between iterations.

Of course, not all embodiments iterate, and the basic improvement in channel estimation accuracy comes from the use of the first estimation process to gain information about (second order) channel statistics. With this approach, an estimate of the channel between the j-th transmit antenna and the i-th receive antenna, $H_{i,j}(f)$, can be calculated quickly, in a few strategic steps. As noted, the first step is performing channel estimation using an estimation process that does not depend on knowledge of the channel statistics. The ML and LSE algorithms are two such examples. Taking ML for example, the channel estimate $\hat{h}_{i,j}(l)$ is transformed to the frequency domain, creating the ML estimate of the channel frequency response:

$$\hat{H}_{i,j}^{ML}(f) = \sum_{l=1}^{L} \hat{h}_{i,j}^{ML}(l) \exp\left\{-j 2\pi \frac{fl}{N}\right\}. \tag{Eq. 9}$$

At the next step, the estimate from (Eq. 9) is used to estimate the channel correlation matrix as $$\hat{K}_H(f_p, f_m) = \tag{Eq. 10}$$

$$\frac{1}{N_f - |f_p - f_m|} \sum_{f=1}^{N_f - |f_p - f_m|} \hat{H}_{i,j}^{ML}(f) \left[\hat{H}_{i,j}^{(ML)}(f + f_p - f_m)\right]^*$$

and noise spectral density $$\hat{g}_i = \frac{1}{M N_{tx}} \sum_{f_m=1}^{M} \sum_{j=1}^{N_{tx}} \left| Y_{i,j}(f_m) - P_j(f_m) \hat{H}_{i,j}^{ML}(f_m) \right|^2. \tag{Eq. 11}$$

Substituting (Eq. 10) and (Eq. 11) into (Eq. 2) gives a new MAP estimate as:

$$\hat{H}_{i,j}^{MAP}(f) = \sum_{m=1}^{M} \hat{W}_j(f, f_m) Y_{i,j}(f_m), \tag{Eq. 12}$$

where the coefficients $\hat{W}_j(f,f_m)$ are computed as follows:

$$\hat{W}_j(f, f_m) = \sum_{p=1}^{M} \hat{K}_H(f, f_p) P_j(f_p) \hat{A}_j^{-1}(f_p, f_m), \tag{Eq. 13}$$

where $\hat{A}_j^{-1}(f_p, f_m)$ are the elements of the matrix $\hat{A}_j^{-1}$ which is inverse to the matrix $\hat{A}_j$ with $$\hat{A}_j(f_p, f_m) = \hat{g}_i \delta(f_p - f_m) + P_p^*(f_p) \hat{K}_H(f_p, f_m) P_j(f_m). \tag{Eq. 14}$$

Figure 5:
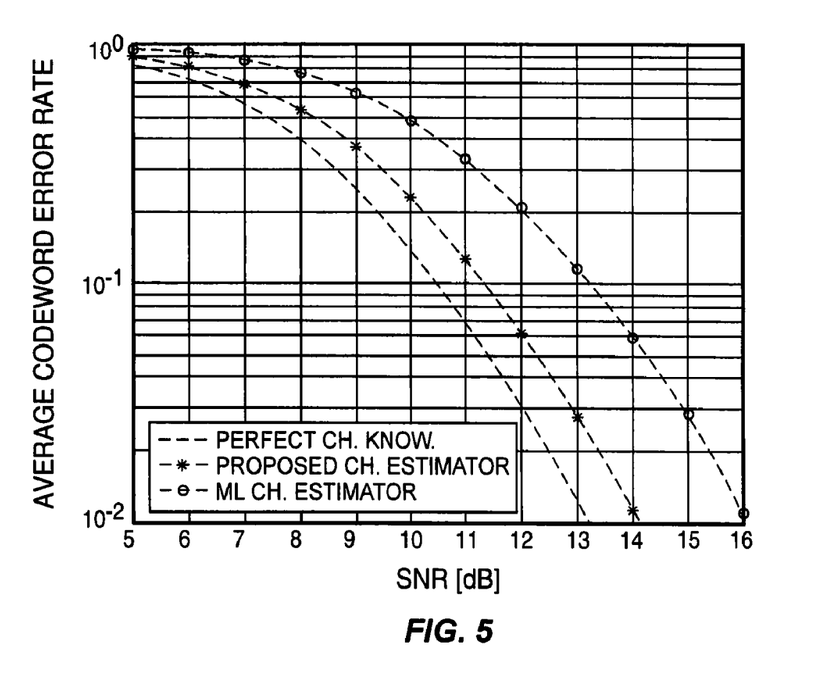
FIG. 5 is a performance diagram plotting codeword error rates for channel estimation based on perfect channel knowledge (idealized), based on ML estimation, and based on one embodiment of the estimation proposed herein.

In assessing expected performance for the first/second channel estimation processing proposed herein, the inventors based simulations on more than 100 different channel realizations, using average codeword error rate as the performance measure. FIG. 5 illustrates the simulated performance, as compared to performance based on perfect channel knowledge, and performance based on ML channel estimation only.

In more detail, the evaluation considered a MIMO system with two mobile terminals 30 transmitting to two base stations 20 on the uplink. The antennas 22 at both base stations 20 were used to receive and jointly detect the information bits from a first one of the mobile terminals 30. In this context, it should be noted that the transmissions from the second mobile terminal 30 creates spatially correlated interference when detecting the bits from the first mobile terminal 30. Because of this interference, the correlation between the i-th and the k-th base stations 20 has the form $$R_{i,k}(f) = g_i \delta(i-k) + H_{i,2}(f) H_{k,2}^*(f). \tag{Eq. 15}$$

Figure 6:
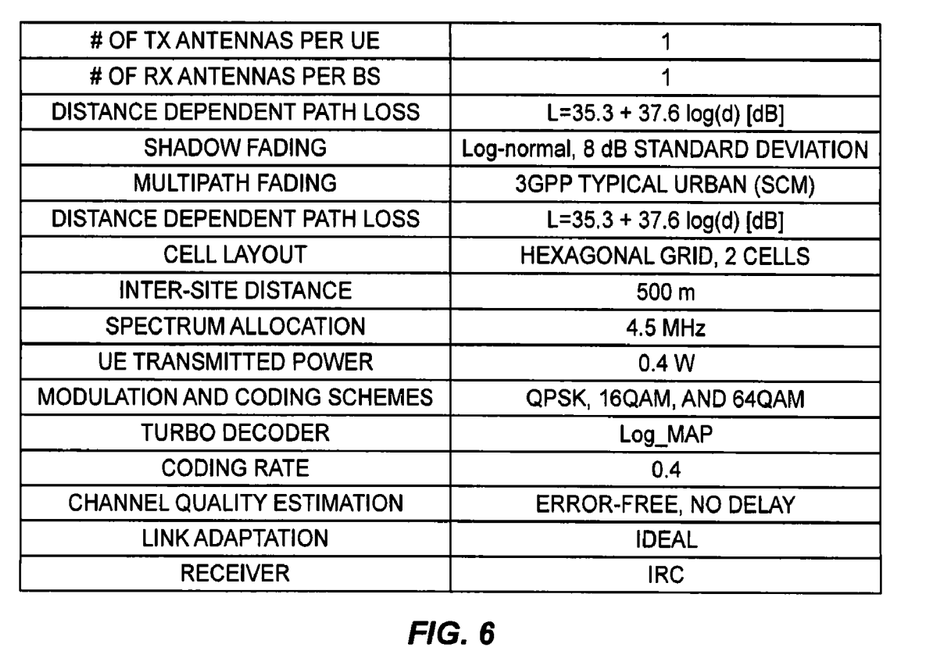
FIG. 6 is a table illustrating models and parameters associated with the plot of FIG. 5.

For demodulation processing at a first one of the two base stations 20, the noise correlation matrix $R_{i,k}(f)$ was estimated using the following algorithm:

$$\hat{R}_{i,k}(f) = \hat{g}_i \delta(i-k) + \hat{H}_{i,2}(f) \hat{H}_{k,2}^*(f), \tag{Eq. 16}$$

where $\hat{H}_{i,j}(f) = \hat{H}_{i,j}^{(M,L)}(f)$ when the ML channel estimator was used, and where $\hat{H}_{i,j}(f) = \hat{H}_{i,j}^{(MAP)}(f)$ when the proposed channel estimator was used. That is, one embodiment of the base station 20 used a conventional ML-based channel estimation process, and another embodiment implemented a version of the receiver circuit 42, providing channel estimation as proposed herein. The models and parameters for the full simulation are given in the table shown in FIG. 6.

With that model/parameter information in mind, the performance curves shown in FIG. 5 plot the average codeword error rate as a function of the average signal-to-noise ratio (SNR) at the receiver of a first one of the two base stations 20. One sees that at an average codeword error rate of one-percent, the channel estimator proposed herein outperforms the conventional ML estimator by 2 dB.

Of course, that result and the associated performance simulation are non-limiting examples of the advantages obtained by use of the proposed channel estimator. Indeed, the proposed channel estimator of the present invention is not limited by the foregoing discussion or by the accompanying illustrations. Rather, it is limited only by the following appended claims and their legal equivalents.

What is claimed is:

1. A method of generating channel estimates in a wireless communication receiver, for processing a received Orthogonal Frequency-Division Multiplexing (OFDM) communication signal, the method comprising:
   generating first channel estimates jointly for a group of OFDM subcarriers in the received OFDM communication signal from a set of pilot observations obtained from the received OFDM communication signal, using a first channel estimation process not dependent on knowledge of channel statistics;
   estimating channel statistics and a noise variance from the first channel estimates; and
   generating second channel estimates jointly for the group of OFDM subcarriers from the set of pilot observations, the estimated channel statistics, and the estimated noise variance, using a second channel estimation process dependent on knowledge of the channel statistics.

2. The method of claim 1, further comprising generating revised estimates of the channel statistics and noise variance from the second channel estimates, and generating revised second channel estimates from the set of pilot observations, the revised estimated channel statistics, and the revised estimated noise variance.

3. The method of claim 1, wherein the received communication signal comprises the OFDM signal including a number of pilot symbols at given sub-carrier frequencies within an OFDM frequency band, and wherein the pilot observations correspond to the pilot symbols.

4. The method of claim 3, wherein generating the first channel estimates includes determining channel taps at which to generate respective ones of the first channel estimates by transforming received pilot symbols into the time domain to obtain a set of channel taps, and selecting channel taps in the set that are above a defined strength threshold.

5. The method of claim 3, wherein generating the first channel estimates comprises translating the pilot observations into the time domain and generating time-domain channel estimates therefrom, translating the time-domain channel estimates back into the frequency domain, to obtain the first channel estimates, and estimating the channel statistics in the frequency domain, based on the first channel estimates.

6. The method of claim 5, wherein generating the second channel estimates comprises computing a linear interpolation filter in the frequency domain, and generating the second channel estimates for one or more data sub-carrier frequencies within the OFDM frequency band, which are different than the given sub-carrier frequencies of the pilot symbols.

7. The method of claim 6, wherein generating the second channel estimates comprises generating the second channel estimates in a Bayesian estimation process.

8. The method of claim 1, wherein generating the first channel estimates comprises generating the first channel estimates in a Maximum Likelihood (ML) estimation process, or in a Least Squares Estimation (LSE) process, based on the set of pilot observations and corresponding known nominal pilot symbol values.

9. The method of claim 1, wherein generating the second channel estimates comprises generating the second channel estimates in a Maximum a Posteriori (MAP) estimation process, based on the estimated channel statistics, the estimated noise variance, and the set of pilot observations.

10. The method of claim 1, wherein estimating the channel statistics comprises estimating a frequency-domain channel correlation matrix.

11. A receiver circuit for generating channel estimates for processing a received Orthogonal Frequency-Division Multiplexing (OFDM) communication signal in a wireless communication receiver, said receiver circuit comprising:
 a first channel estimator configured to generate first channel estimates jointly for a group of OFDM subcarriers in the received OFDM communication signal from a set of pilot observations obtained from the received OFDM communication signal, using a first channel estimation process not dependent on knowledge of channel statistics;
 a statistical estimator configured to estimate channel statistics and a noise variance from the first channel estimates; and
 a second channel estimator configured to generate second channel estimates jointly for the group of OFDM subcarriers from the set of pilot observations, the estimated channel statistics, and the estimated noise variance, using a second channel estimation process dependent on knowledge of the channel statistics.

12. The receiver circuit of claim 11, wherein the statistical estimator is further configured to generate revised estimates of the channel statistics and the noise variance from the second channel estimates, and wherein the second channel estimator is further configured to generate revised second channel estimates from the set of pilot observations, the revised estimated channel statistics, and the revised estimated noise variance.

13. The receiver circuit of claim 11, wherein the wireless communication receiver comprises the OFDM receiver, and wherein the received communication signal comprises an OFDM signal including a number of pilot symbols at given sub-carrier frequencies within an OFDM frequency band, and wherein the pilot observations correspond to the pilot symbols.

14. The receiver circuit of claim 13, wherein the first channel estimator is configured to generate the first channel estimates by determining channel taps at which to generate respective ones of the first channel estimates, based on transforming received pilot symbols into the time domain to obtain a set of channel taps, and selecting channel taps in the set that are above a defined strength threshold.

15. The receiver circuit of claim 13, wherein the first channel estimator is configured to generate the first channel estimates by translating the pilot observations into the time domain and generating time-domain channel estimates therefrom, translating the time-domain channel estimates back into the frequency domain, to obtain the first channel estimates, and wherein the statistical estimator is configured to estimate the channel statistics in the frequency domain, based on the first channel estimates.

16. The receiver circuit of claim 15, wherein the second channel estimator is configured to generate the second channel estimates by computing a linear interpolation filter in the frequency domain, and generating the second channel estimates for one or more data sub-carrier frequencies within the OFDM frequency band, which are different than the given sub-carrier frequencies of the pilot symbols.

17. The receiver circuit of claim 16, wherein the second channel estimator is configured to generate the second channel estimates in a Bayesian estimation process.

18. The receiver circuit of claim 11, wherein the first channel estimator is configured to generate the first channel estimates in a Maximum Likelihood (ML) estimation process, or in a Least Squares Estimation (LSE) process, based on the set of pilot observations and corresponding known nominal pilot symbol values.

19. The receiver circuit of claim 11, wherein the second channel estimator is configured to generate the second channel estimates in a Maximum a Posteriori (MAP) estimation process, based on the estimated channel statistics, the estimated noise variance, and the set of pilot observations.

20. The receiver circuit of claim 11, wherein the statistical estimator is configured to estimate a frequency-domain channel correlation matrix, as said channel statistics.

* * * * *

UNITED STATES PATENT AND TRADEMARK OFFICE
CERTIFICATE OF CORRECTION

PATENT NO. : 8,379,773 B2  Page 1 of 1
APPLICATION NO. : 12/489924
DATED : February 19, 2013
INVENTOR(S) : Krasny et al.

It is certified that error appears in the above-identified patent and that said Letters Patent is hereby corrected as shown below:

In the Specification

In Column 1, Line 52, delete " $ji \neq j$ " and insert -- $j1 \neq j$ --, therefor.

In Column 2, Line 6, in Eq. 2, delete " $H_{i,j}(f)$ " and insert -- $H_{i,j}(f)$ --, therefor.

In Column 7, Line 64, delete " $\hat{A}_j^{-1}(f_p, f_m)$ " and insert -- $A_j^{-1}(f_p, f_m)$ --, therefor.

In Column 7, Line 67, in Eq. 14, delete " $P_p^*(f_p)$ " and insert -- $P_j^*(f_p)$ --, therefor.

In the Claims

In Column 8, Line 18, In Eq. 15, delete " $H_{k,2}^*(f)$ " and insert -- $H_{k,2}^*(f)$ --, therefor.

In Column 8, Line 23, In Eq. 16, delete " $H_{k,2}^*(f)$ " and insert -- $H_{k,2}^*(f)$ --, therefor.

Signed and Sealed this
Fourth Day of June, 2013

Teresa Stanek Rea
*Acting Director of the United States Patent and Trademark Office*